(12) United States Patent
Pladson et al.

(10) Patent No.: US 10,697,652 B2
(45) Date of Patent: Jun. 30, 2020

(54) WIRELESS CONTROL DEVICE

(71) Applicant: Alpine Research, LLC, Deer Isle, ME (US)

(72) Inventors: William Hale Pladson, Deer Isle, ME (US); John Cochran Pladson, Montrose, CO (US)

(73) Assignee: Alpine Research, LLC, Deer Isle, ME (US)

( * ) Notice: Subject to any disclaimer, the term of this patent is extended or adjusted under 35 U.S.C. 154(b) by 267 days.

(21) Appl. No.: 15/901,959

(22) Filed: Feb. 22, 2018

(65) Prior Publication Data

US 2018/0238564 A1 Aug. 23, 2018

Related U.S. Application Data

(60) Provisional application No. 62/462,539, filed on Feb. 23, 2017.

(51) Int. Cl.
| | |
|---|---|
| *F24D 19/10* | (2006.01) |
| *G05D 23/19* | (2006.01) |
| *H04L 29/08* | (2006.01) |
| *F24C 3/12* | (2006.01) |
| *F24C 3/00* | (2006.01) |
| *H04W 84/12* | (2009.01) |

(52) U.S. Cl.
CPC .......... *F24D 19/1084* (2013.01); *F24C 3/006* (2013.01); *F24C 3/122* (2013.01); *F24D 19/10* (2013.01); *G05D 23/19* (2013.01); *H04L 67/125* (2013.01); *F24D 2220/042* (2013.01); *G05D 23/1917* (2013.01); *H04W 84/12* (2013.01)

(58) Field of Classification Search
CPC .. F24D 19/10; F24D 19/1084; G05D 23/1927
See application file for complete search history.

(56) References Cited

U.S. PATENT DOCUMENTS

| | | | | |
|---|---|---|---|---|
| 5,450,841 A | * | 9/1995 | Whitaker | F23N 1/005 126/512 |
| 6,413,079 B1 | | 6/2002 | Lyons | |
| 7,497,386 B2 | * | 3/2009 | Donnelly | F23N 1/002 236/15 BG |
| 2011/0005511 A1 | * | 1/2011 | Marple | F23B 60/02 126/540 |
| 2011/0006887 A1 | * | 1/2011 | Shaull | G05B 15/02 340/12.37 |
| 2015/0072649 A1 | * | 3/2015 | Huang | H04W 12/02 455/411 |
| 2015/0276239 A1 | * | 10/2015 | Fadell | G05D 23/1905 237/2 A |

* cited by examiner

*Primary Examiner* — Edward F Landrum
*Assistant Examiner* — Daniel C Comings (57) ABSTRACT

An internet-based device for remotely controlling the flow of electricity to electrical devices that operate on millivolt or low voltage currents, including electrically operated gas powered fireplaces.

7 Claims, 13 Drawing Sheets

WIRELESS CONTROL DEVICE

BACKGROUND INFORMATION

Field of the Invention

The invention relates to wireless and remote control devices that are used to remotely operate electrical devices, such as those used with home automation systems.

Discussion of Prior Art

Many electrical devices, such as those used with home automation systems, are connectable to the internet or other network based systems. This connection allows operators to control the device(s) using wireless technologies, such as mobile or cellular networks, BLUETOOTH and/or wireless local area networks based on the IEEE 802.11 standards (i.e. Wi-Fi).

There are a number of known wireless control devices, many of which are designed to control home automation systems, however, the vast majority of these control devices are designed to operate low voltage systems and appliances, with 24-volt alternating current ("AC") systems being the most common. For example, the Nest installation guide specifically states that "the Nest and other thermostatic devices only work on 24 Volt AC ("VAC") circuits."

However, not all electrical devices or systems work on low voltage. Some electrical devices are millivolt devices, which are devices that typically run on 3 to 6 volts direct current ("VDC") and in some instances run on less than 1 VDC. One notable set of millivolt devices are electrically controlled gas powered fireplaces, stoves, and/or fire pits, which typically require between 3 and 6 volts DC, and that are not controllable by the typical low voltage automation systems such as the NEST or Honeywell thermostats. More specifically, electrically controlled gas fireplaces and stoves are generally standing pilot millivolt/low-volt DC devices that are typically controlled by either a rocker switch, a thermostat that requires a 20' to 30' wire to be connected directly to the fireplace, or a "coffee table" remote control that typically operates over a radio frequency (RF) and that limits control to less than 50 feet.

What is needed, therefore, is a wireless control device that is operable over a mobile network and that has the capability of controlling electrical devices that run on a millivolt current in addition to controlling devices requiring a low voltage current.

BRIEF SUMMARY OF THE INVENTION

The inventive device is a web based universal dry contact millivolt/low-volt DC control for remotely controlling electrical devices. In the main embodiment, the control device allows millivolt-controlled appliances, such as electrically controlled gas fireplaces and gas stoves, to be operated with a computer or "smart" device such as a cellular phone or tablet that has an internet or cellular connection. The control device has a temperature sensing switch that eliminates the distance and location boundaries of the prior art, thereby allowing the user to monitor and control their fireplace, or other electrical device, and its features from anywhere an internet or cell phone connection is available.

BRIEF DESCRIPTION OF THE DRAWINGS

The present invention is described with reference to the accompanying drawings. In the drawings, like reference numbers indicate identical or functionally similar elements. The drawings are not drawn to scale.

DETAILED DESCRIPTION OF THE INVENTION

The present invention will now be described more fully in detail with reference to the accompanying drawings, in which the preferred embodiments of the invention are shown. This invention should not, however, be construed as limited to the embodiments set forth herein; rather, they are provided so that this disclosure will be complete and will fully convey the scope of the invention to those skilled in the art.

FIGS. 1-3D illustrate the first embodiment of a control device 100 according to the invention for wirelessly controlling of an electrical device FP, including electrical devices that are operable by a millivolt direct current (DC) as well as those that are operable by low voltage alternating current (AC). The description hereinafter refers to the electrical device FP as an electrically controlled gas powered fireplace, or simply as a fireplace, however, it is understood that the control device 100 may be used with other devices that are controllable by a millivolt DC or low voltage AC systems.

Any conventional gas-powered fireplace that has an ignition system that is powered by a millivolt DC is suitable, for example, the ASC CONTRACTOR SERIES by ALPINE GAS FIREPLACES or the C-VIEW C620 by MONTIGO. In the embodiment shown, the fireplace FP is connected to a conventional electronic ignition system IS that is able to activate or deactivate a flame in the fireplace FP.

The control device 100 includes a circuit board 10 having a programmable microcontroller 12 that includes a Wi-Fi chip or module 14, a power connector 16 for connecting to an external power source (not shown), and a connection wire 18. The connection wire 18 is physically connected to the electrical ignition system IS, illustrated in FIG. 5, the electrical ignition system IS being connected to the fireplace FP, and the programmable microcontroller 12 is connectable to a wireless network N. A user interface device UI that has wireless transmission capabilities is programmed to send signals to the control device 100. The power connector 16 provides electricity to the control device 100 from the external power source, and to the fireplace FP through the control device 100 when instructed to do so by the user interface device UI, thereby allowing an operator to remotely control the fireplace FP.

The programmable microcontroller 12 is a device having a microcontroller 22, the Wi-Fi module 14 and one or more digital and analog input/output pins 24. For example, the PARTICLE.IO PHONTON is a suitable programmable microcontroller 12 that may be programmed using conventional programming techniques to receive input through the Wi-Fi module 14 and to perform certain tasks, such as opening and closing relays, based on that input. More specifically, such programmable microcontrollers are devices that typically have their own developmental toolkits that allow programmers to control the software and hardware on the programmable microcontroller 12 using conventional programming techniques. The Wi-Fi module 14, or Wi-Fi chip, is a device such as the CYPRESS CYW43362 that enables a connection to a wireless network such as the network N, and allows an operator using the user interface device UI to wirelessly access the control device 100. The Wi-Fi module 14 may also be connected to an external Wi-Fi antenna 26 to boost the signal strength and enable connection to wireless signals that are farther way from the control device 100.

Some programmable microcontrollers run on a limited voltage, such as, for example, 5 volts. To protect the programmable microcontroller 12 from excessive voltage, an optical isolator 23 is provided to electrically isolate the programmable microcontroller 12 from the full voltage of the external power source. However, this also limits the voltage that is able to pass through the programmable microcontroller 12 and may make it impossible to control low voltage devices. To compensate for this, additional operational amplifiers 25, or op-amps, are provided. These op-amps 25 create a pulse-width modulation output that is able to control low voltage devices.

The circuit board 10 also has logic gates 34, 36 and 38, shown in FIGS. 3A-3D, such as a dual 2-input NAND gate with Schmitt-Trigger inputs made by TEXAS INSTRUMENTS, that allow the programmable microcontroller 12 to disable or reset the connected circuitry and open and close isolated relays 42, 44 and 46. The isolated relays serve as switches that are operated by the programmable microcontroller 12 such that they may enable and disable the flow of electricity through the control device 100. The relays 42, 44 and 46 are connected to a plurality of device connection terminals 48, 52, 54, such as sets of screw terminals, with one set 52 connected to the connection wire 18 that connects to the ignition system IS. Closing the relay 44 allows electricity to flow through the control device 100 to the fireplace FP, or in this embodiment to the ignition system IS that ignites the fireplace FP. For low voltage devices, the op-amps 25 similarly connect to an isolated relay 68 that is connected to a device connection terminal 55 that is connectable to a low voltage device.

Figure 1:
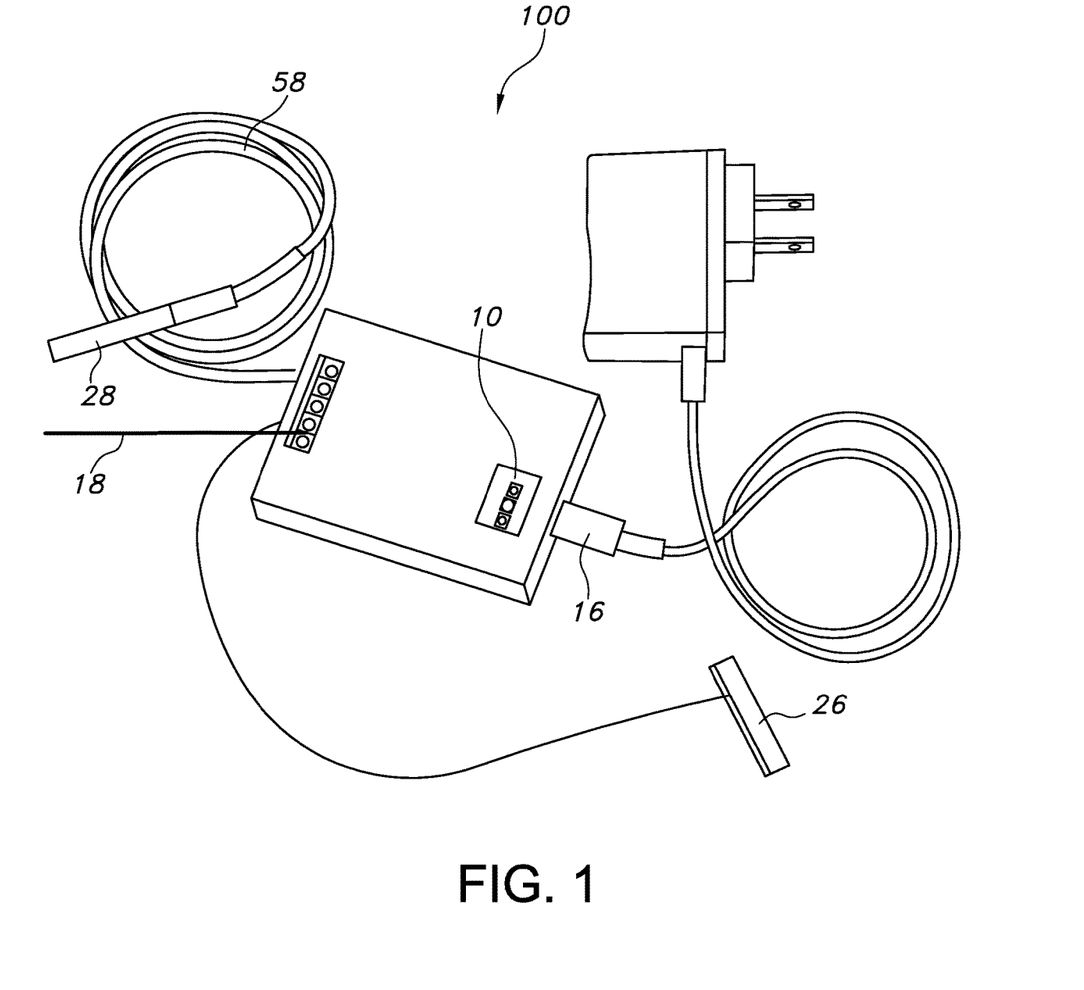
FIG. 1 is a top view of the control device according to the invention.
Figure 2:
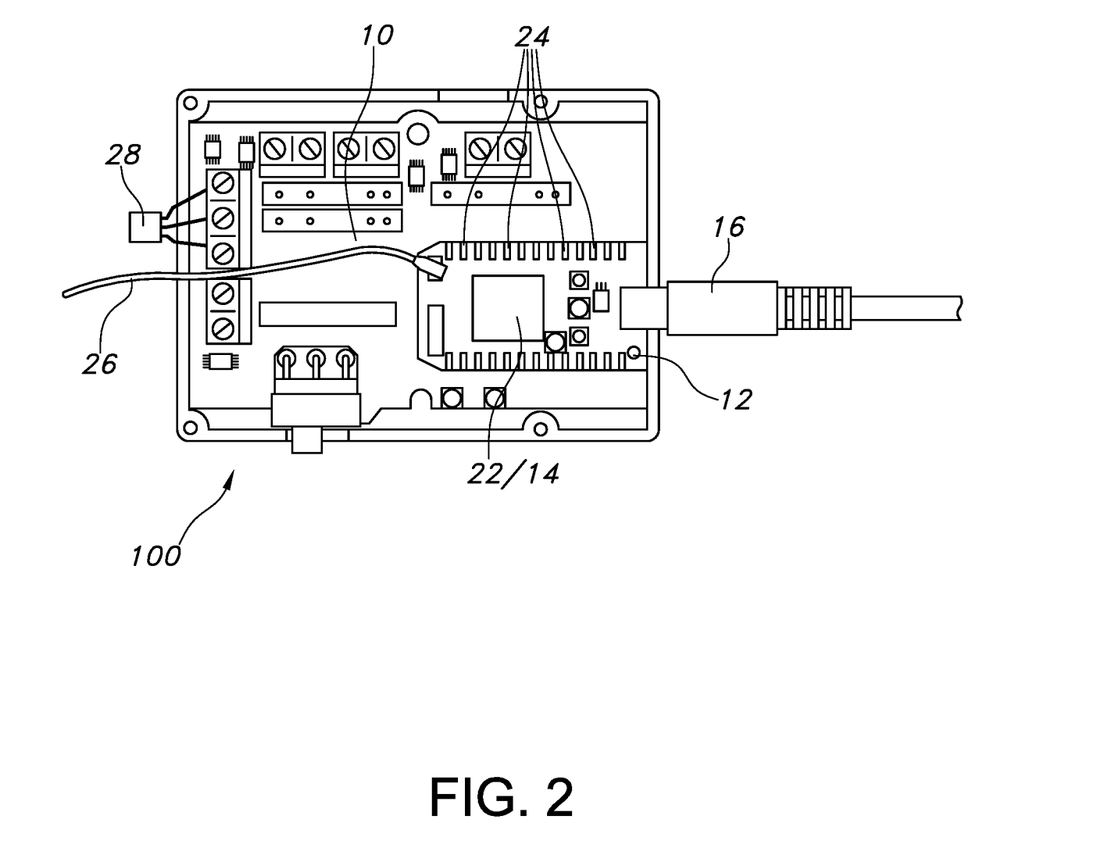
FIG. 2 is a top view of the control device without a cover.
Figure 3:
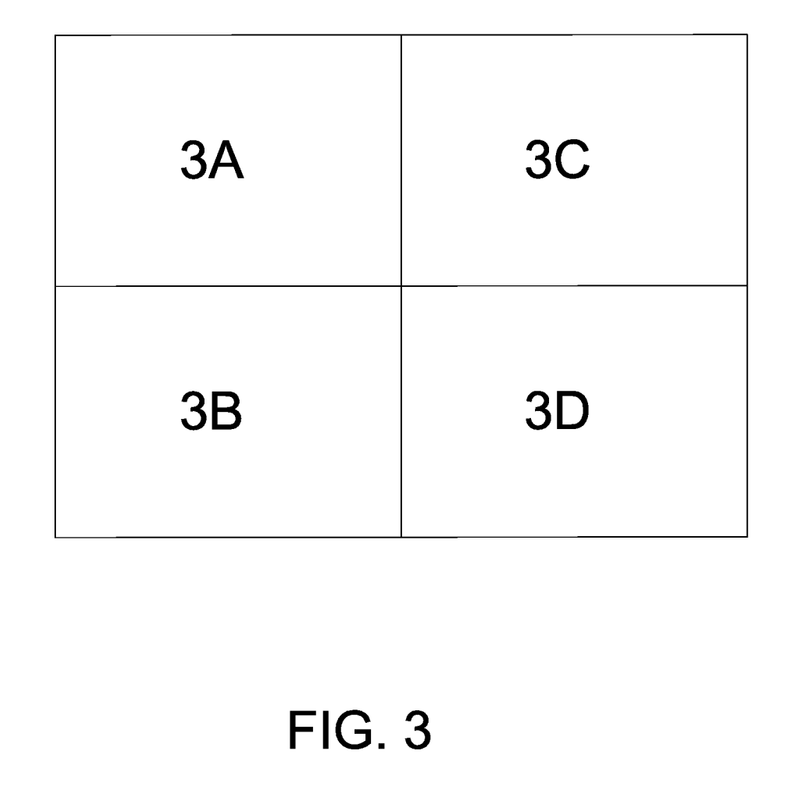
FIG. 3 shows the arrangement of the schematic diagrams in FIGS. 3A-3D of a first embodiment of the control device.
Figure 3A:
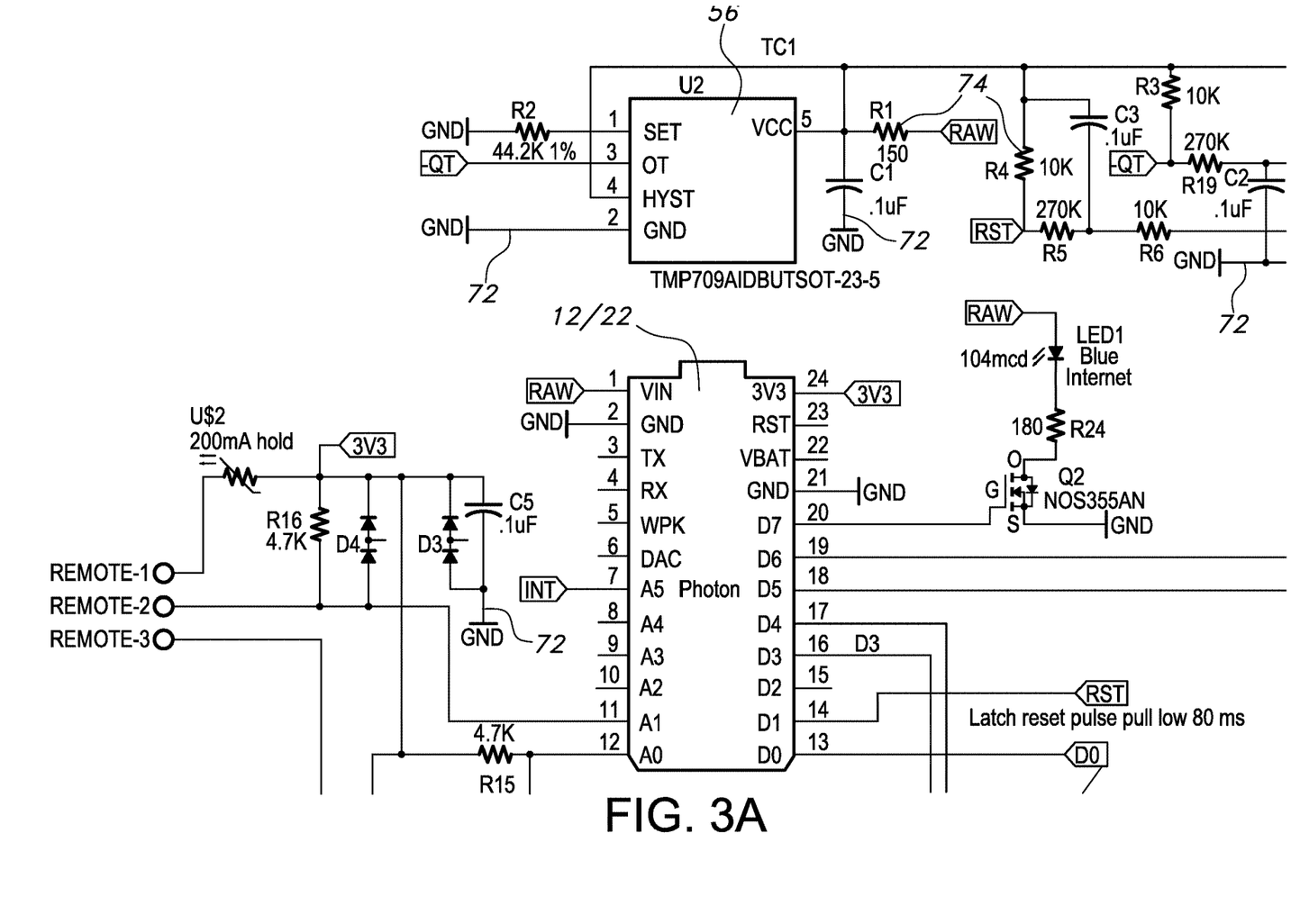
FIG. 3A is a schematic diagram showing the upper left corner of the control device.
Figure 3B:
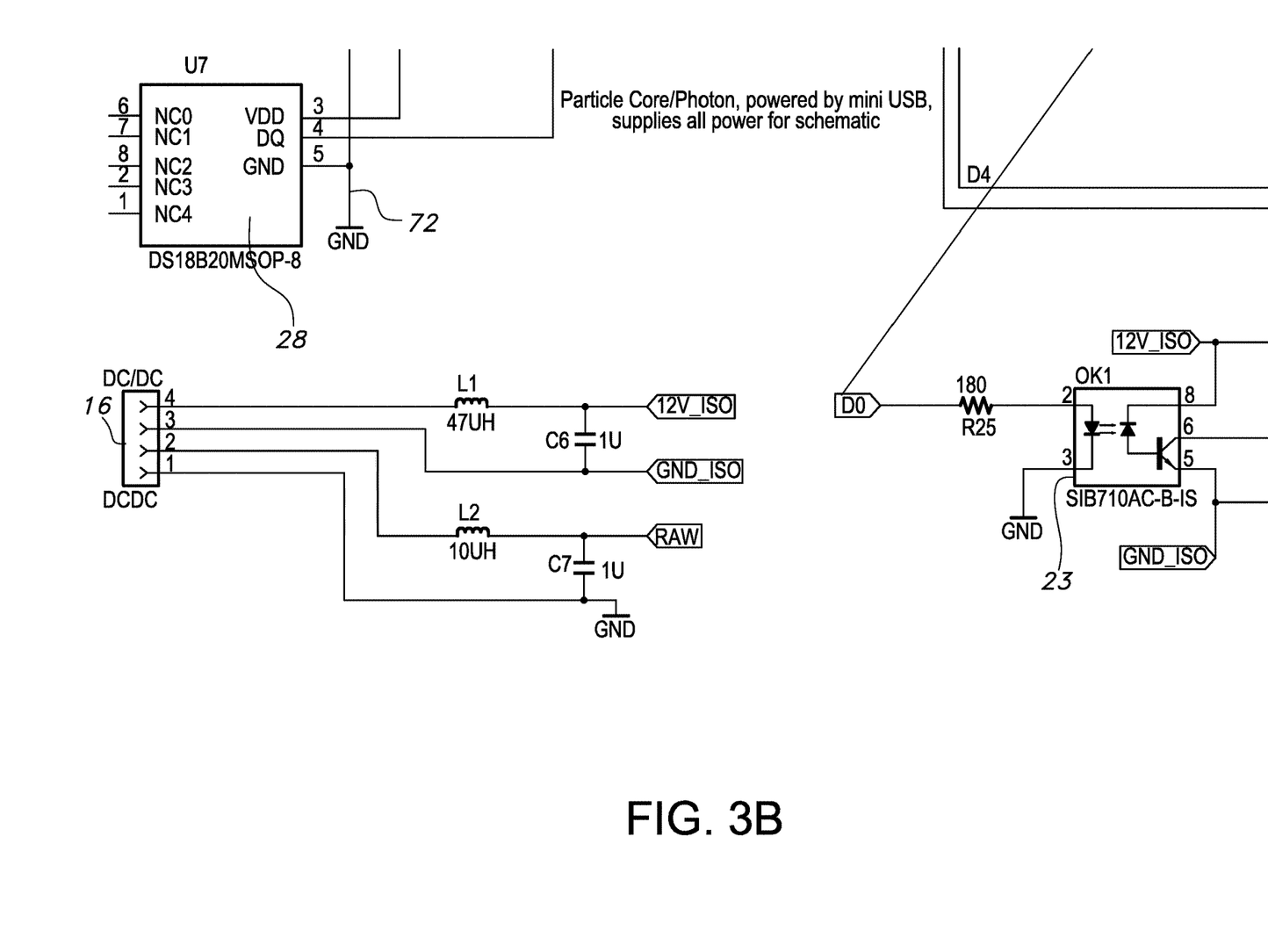
FIG. 3B is a schematic diagram showing the lower left corner of the control device.
Figure 3C:
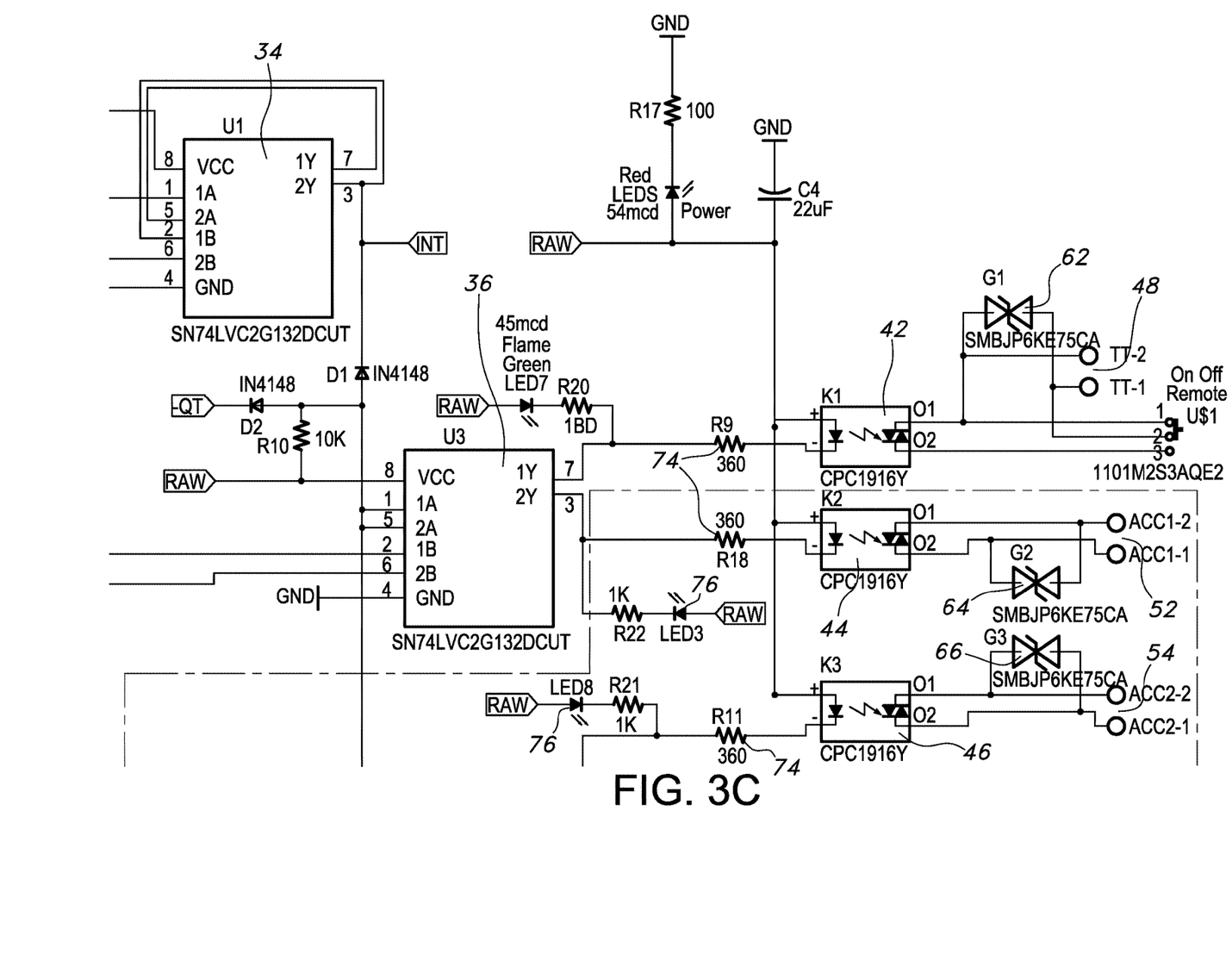
FIG. 3C is a schematic diagram showing the upper right corner of the control device.
Figure 3D:
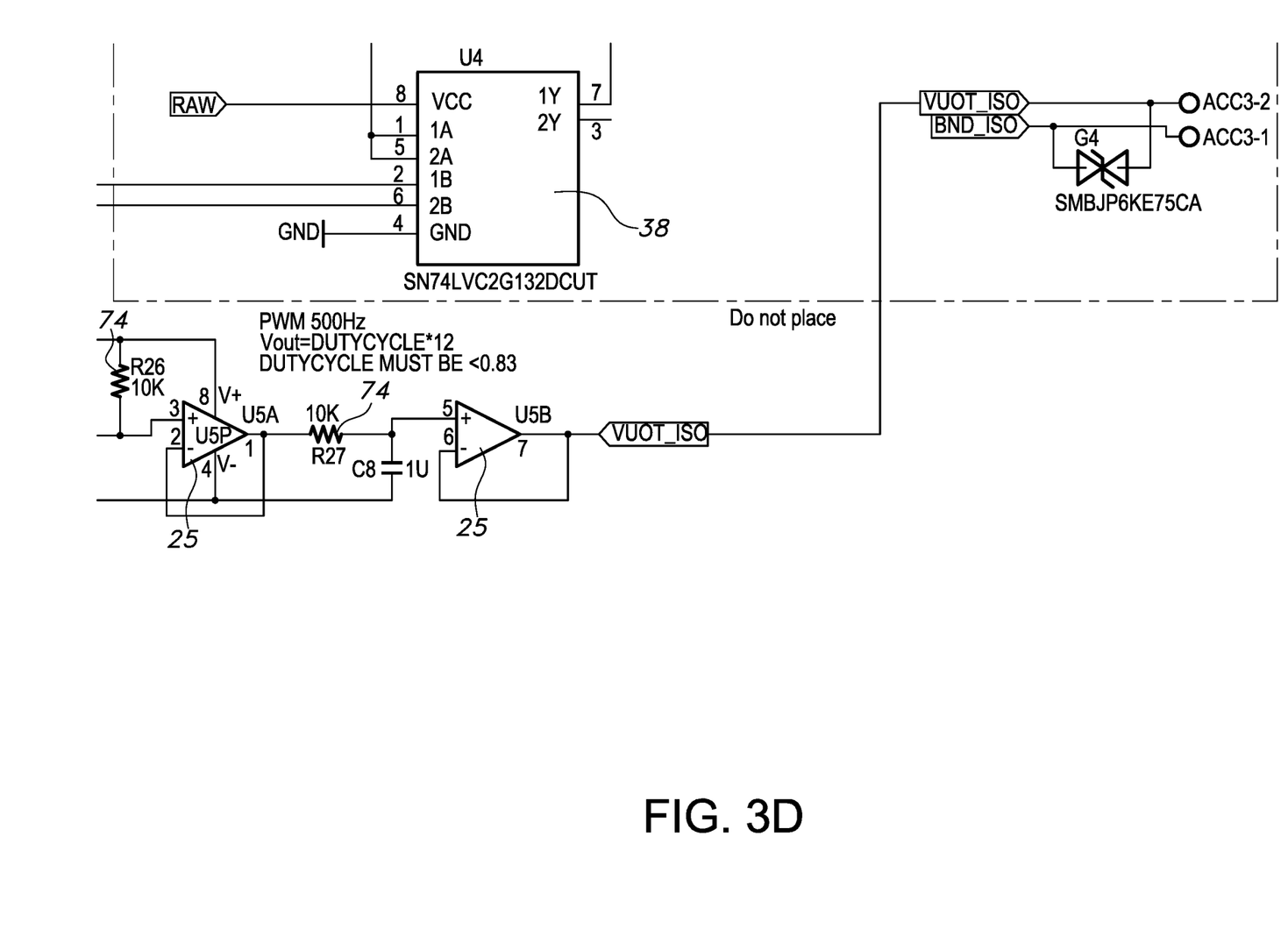
FIG. 3D is a schematic diagram showing the lower right corner of the control device.

An external temperature sensor 28 may be provided to relay the room temperature to the programmable microcontroller 12 and may extend a considerable distance away from the programmable microcontroller 12 and fireplace FP. For example, a cable 58 may connect the external temperature sensor 28 to the programmable microcontroller 12 in order to extend the external temperature sensor 28 some distance away from the programmable microcontroller 12. It is common for the external temperature sensor 28 to extend up to 30 meters from the programmable microcontroller 12 to allow the external temperature sensor 28 to measure the temperature of a room rather than the temperature of the fireplace FP. The programmable microcontroller 12 is programmed to monitor the external temperature sensor 28 and, when the measured temperature passes a user-set temperature, the programmable microcontroller 12 toggles the appropriate logic gate to stop the flow of electricity and shut off the fireplace or, when the temperature drops, toggles the appropriate logic gate to start the fireplace and raise the room temperature. Alternatively, the external temperature sensor 28 may be connected directly to the programmable microcontroller 12 as shown in FIG. 2. There are a number of suitable external temperature sensors, for example, the waterproof temperature probe thermometer DS18B20 made by MAXIM INTEGRATED PRODCUTS.

The other terminals 48, 54, which are not connected to the ignition system, may be connected to other electrical devices and/or home automation systems (not shown) in a similar manner.

The power source 16 connects to a source of electricity, such as a conventional electrical outlet, battery, or generator, and provides electricity to the controller 100 and, when directed, to the one or more electrical devices FP.

As previously explained, the programmable microcontroller 12 is programmed to receive a wireless signal from the user interface device UI and based on that signal turn the fireplace FP on or off. The software also allows the operator to set a specific temperature that the operator desires, whereby the controller 12 activates the logic gate 36, which closes the relay 44, allowing a 3-6 volt DC charge to pass to the fireplace FP via device connection terminal 52 to ignite the flame in the fireplace FP. The external temperature sensor 28 detects the temperature and relays that temperature to the programmable microcontroller 12. Once the temperature reaches the desired level the controller 12 sends a second signal that again toggles the logic gate 36 and opens the relay 44 to terminate the charge to the fireplace FP, shutting off the flame.

Logic gate 34 is connected to a second temperature sensor 56, which monitors the temperature inside the control device 100 and enables two safety mechanisms. The first safety mechanism is a software shutoff. The software on the controller is pre-programmed to open all relays, thus terminating the flow of electricity to the device and thereby shutting off the fireplace FP, when the second temperature sensor 56 detects a certain pre-defined temperature, for example, 135 degrees Fahrenheit. The second safety measure is a hardware shutoff. The programmable microcontroller's 12 hardware is pre-programmed to open all relays when the temperature of the sensor 56 reaches a certain level, for example, 140 degrees Fahrenheit.

Transient voltage suppressors 62, 64, 66, 68 are provided to protect the control device 100 from electrostatic discharge and/or improper hookup. Additional ground wires 72, resisters 74, and diodes 76 are provided as conventionally required, and as indicated by conventional symbols in FIGS. 3 and 4, in all embodiments of the control device 100.

Figure 4:
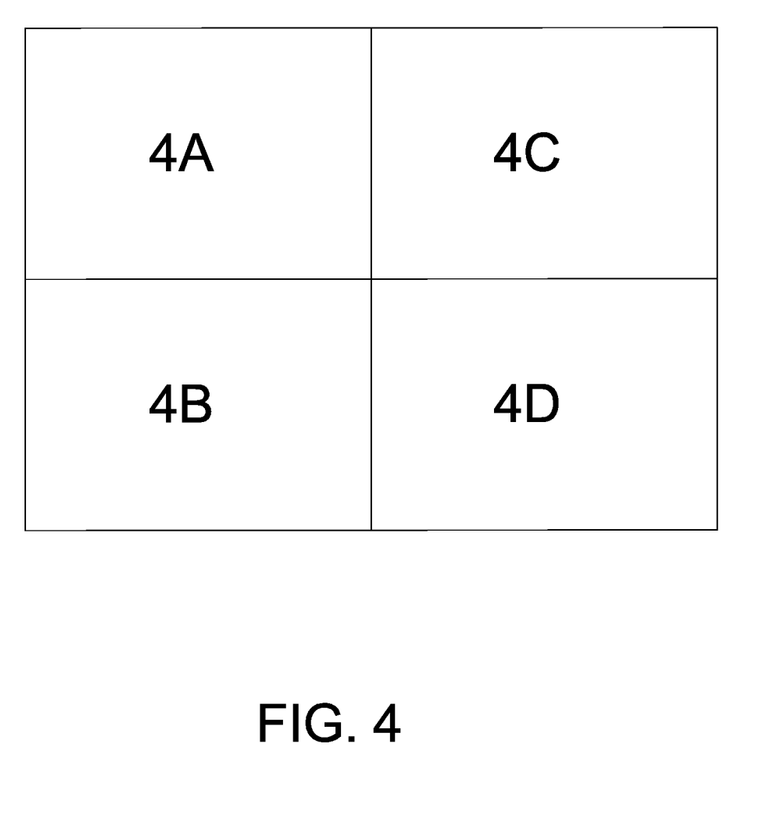
FIG. 4 shows the arrangement of the schematic diagrams in FIGS. 4A-4D of a second embodiment of the control device.
Figure 4A:
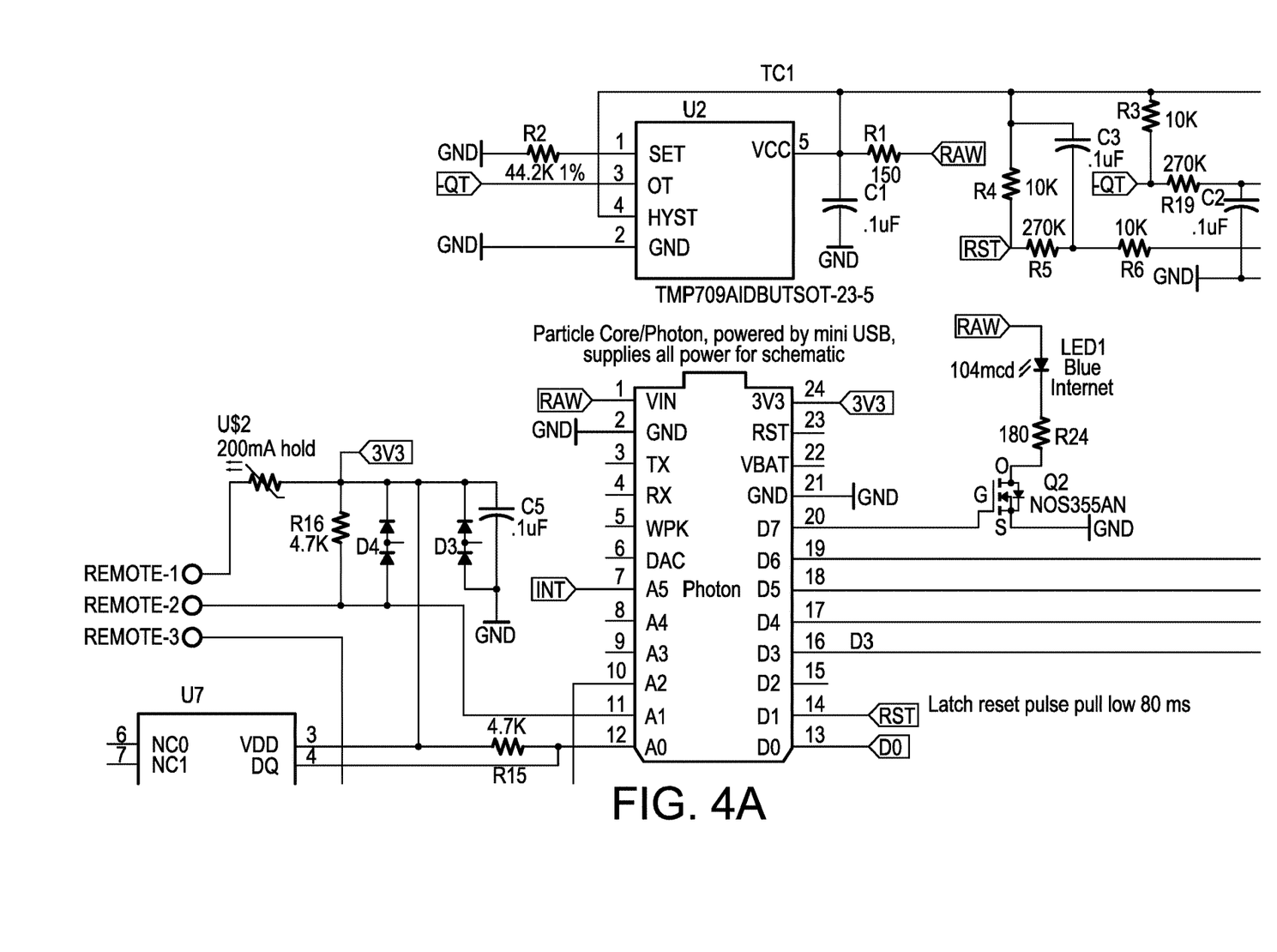
FIG. 4A is a schematic diagram showing the upper left corner of the control device.
Figure 4B:
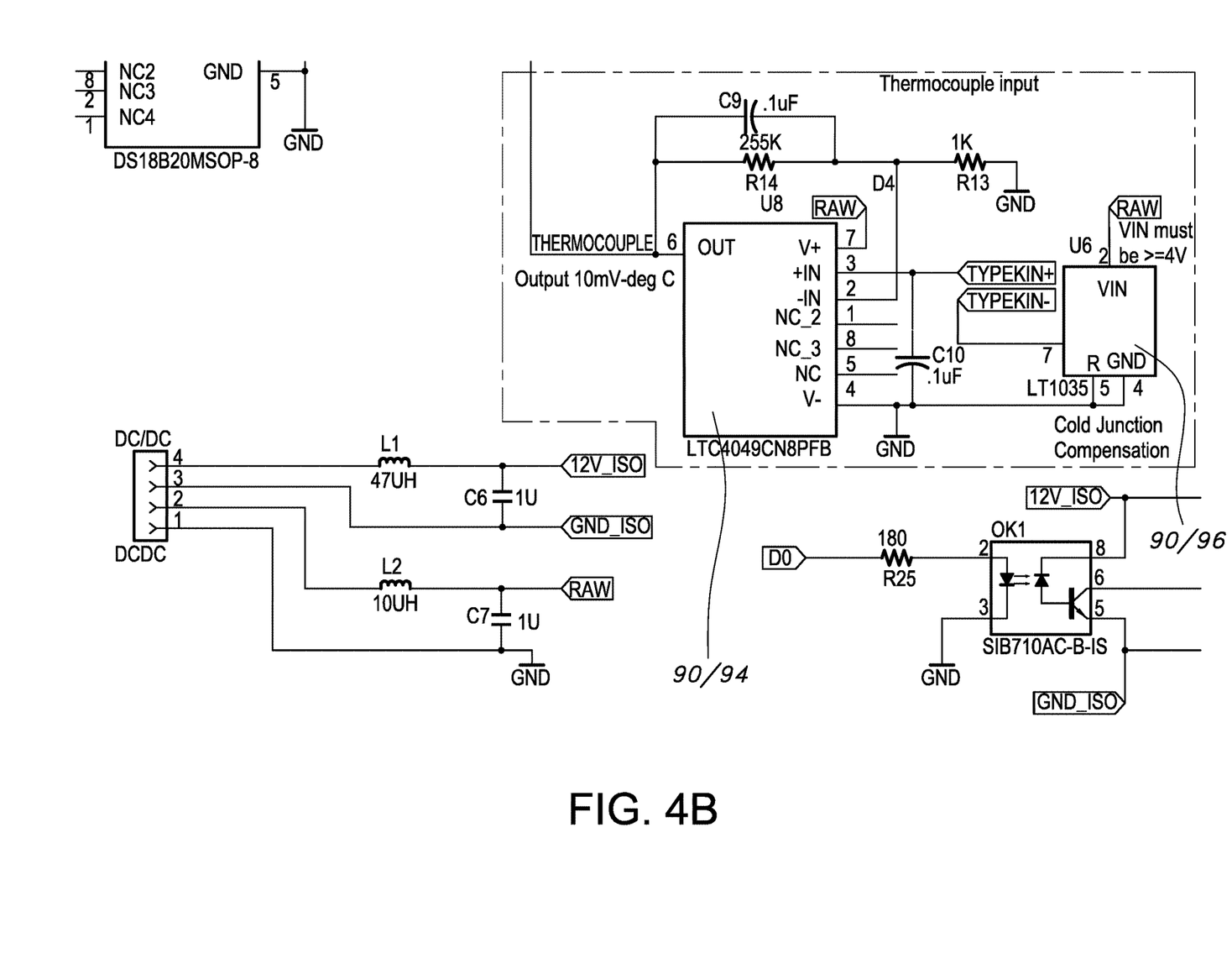
FIG. 4B is a schematic diagram showing the lower left corner of the control device.
Figure 4C:
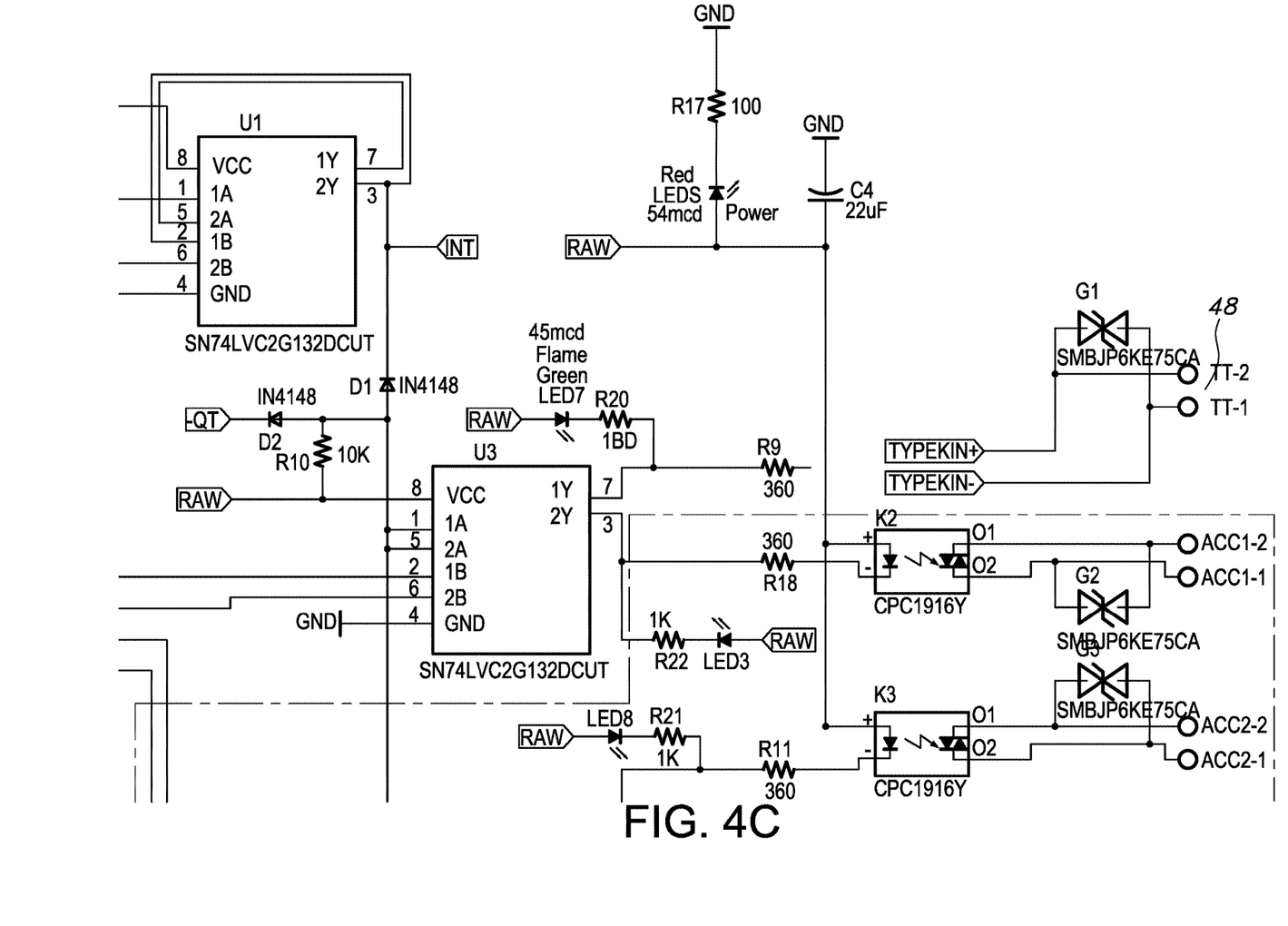
FIG. 4C is a schematic diagram showing the upper right corner of the control device.
Figure 4D:
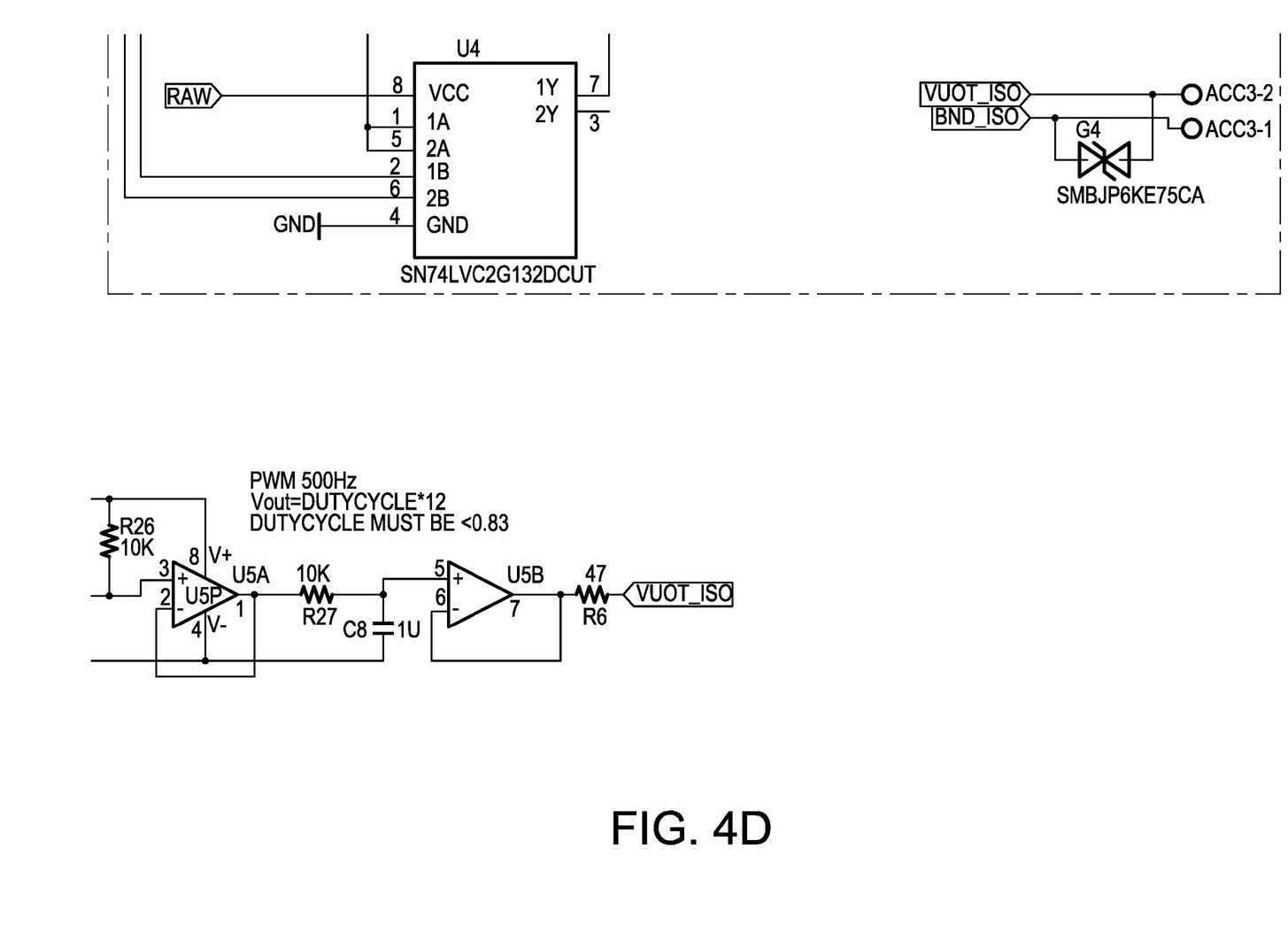
FIG. 4D is a schematic diagram showing the lower right corner of the control device.

FIGS. 4-4D illustrate a second embodiment of the control device 100. This embodiment includes the components, i.e. the programmable microcontroller, logic gates, relays, etc., but also includes an additional thermocouple assembly 90 that monitors the status of the fireplace's flame and reports that status to the user interface device UI, and includes a thermocouple wire 92, shown in FIG. 5, a zero-drift operational amplifier with internal capacitors 94, and a thermocouple cold junction compensator 96.

The thermocouple wire 92 is connected to device connection terminal 48 on the control device 100 and extends into the fireplace near the source of the flame. The zero-drift operational amplifier with internal capacitors 94 is connected to the programmable microcontroller 12 and the thermocouple cold junction compensator 96 is connected to the thermocouple wire 92. Relay 42 has been removed so as to allow a direct and continuous connection the cold junction compensator 96. There are a number of suitable amplifiers, such as, for example, the LTC1049 that is manufactured by Linear Technology. Similarly, a number of thermocouple cold junction compensators may be suitable, such as the LT1025, also made by Linear Technology.

The thermocouple wire assembly 90 serves as a safety mechanism to alert a remote user when the flame is lit but not supposed to be, or that it is failing to light when the user is attempting to start the fireplace. When the thermocouple wire 92 heats up, it produces a small amount of DC electricity; the programmable microcontroller 12 reads the voltage coming back from the wire and once the voltage crosses a defined threshold the software concludes that the flame is lit. For example, if the temperature is at 100 degrees, there is a very small amount of voltage; once the temperature reaches 300 degrees, the wire returns a significantly greater amount of voltage. Using standard thermocouple wire with a standard fire pass, a return voltage of 0.64 volts typically reveals a lit flame.

In a third embodiment, the control device 100 is used with a gas powered fire pit in an outdoor environment. The control device 100 connects to the fire pit in the same manner in which it connects to the fireplace described above. However, in this embodiment, additional software is deployed to create a geo-fence or other technologies around the fire pit such that an operator may not activate the fire pit unless they are within a certain pre-programmed distance, for example, 50 feet. This geo-fencing safety device prevents an operator from activating the open fire pit when the user interface device UI is not on the same wireless router and/or the user interface device UI is not within the pre-programmed distance. More specifically, during installation the latitude and longitude of the fire pit is stored, for example, in a database. Then, at time of operation, the latitude and longitude on the user interface device is compared to the latitude and longitude stored in the database and if the distance between the user interface device UI and the fire pit is greater than the allowable distance the 'On' operation is denied. Alternatively, the geo-fence may be implemented using the MAC address of the router. Each router has a unique address. When the device 100 is installed the MAC address of the router that is connected to the device 100 is loaded into the database. Later, at operational time, the MAC address of the router that the user interface device UI is connected to needs to be the same as the MAC address that the device 100 is connected to or the 'On' operation is denied.

In a fourth embodiment, two control devices 100 are used together monitor the temperature in the room and to control the fireplace FP. In this embodiment, a first device 100 is connected to the fireplace FP as previously described and a second device 100 is placed in the same room as the fireplace FP but a suitable distance away from the fireplace FP in order to detect the temperature of the room rather than of the fireplace. The user interface device UI is programmed to send control signals, i.e. on/off signals, to the first device and is programed to read the temperature from the second device. When the first and second devices 100 are manufactured for this fourth embodiment certain components may be omitted. For example, the first device 100 may be constructed without a temperature sensor and the second device may be constructed without the circuitry to deliver electricity through the second device 100.

In a fifth embodiment, two control devices 100 may be used in different locations to control a single system. As an example, consider a scenario common with ski resorts. There is a restaurant located on a mountain that has a cistern for storing water, the cistern being connected to a pipeline that connects to a well at the bottom of the mountain. When the cistern reaches a predefined low-water level a pump in the well is turned on and water is pumped to the cistern until the water level in the cistern reaches a predefined high-water level at which time the pump is turned off. A first device 100 may have a water sensor in place of the external temperature sensor 28, the water sensor being placed in the cistern and the device connected to a local network. A second device 100 is connected to the well pump in the same manner that the first embodiment is connected to a fireplace FP and is also connected to a local network. When the water in the cistern reaches the predefined low water level the first device 100 may send an alert to the user interface device and the user interface device may be used to send a signal to the second device 100 to activate the pump. Or, the first device 100 may send a signal directly to the second device 100 instructing the second device 100 to activate the pump. In both instances, the first device 100 continues to monitor the water level in the cistern and sends a signal when the water reaches the high-water level. As with the fourth embodiment, certain components that are not relevant to the intended use may be omitted from the device during manufacture. There are a number of suitable water sensors, such as, for example, the LMP633 made by LEEG.

Figure 5:
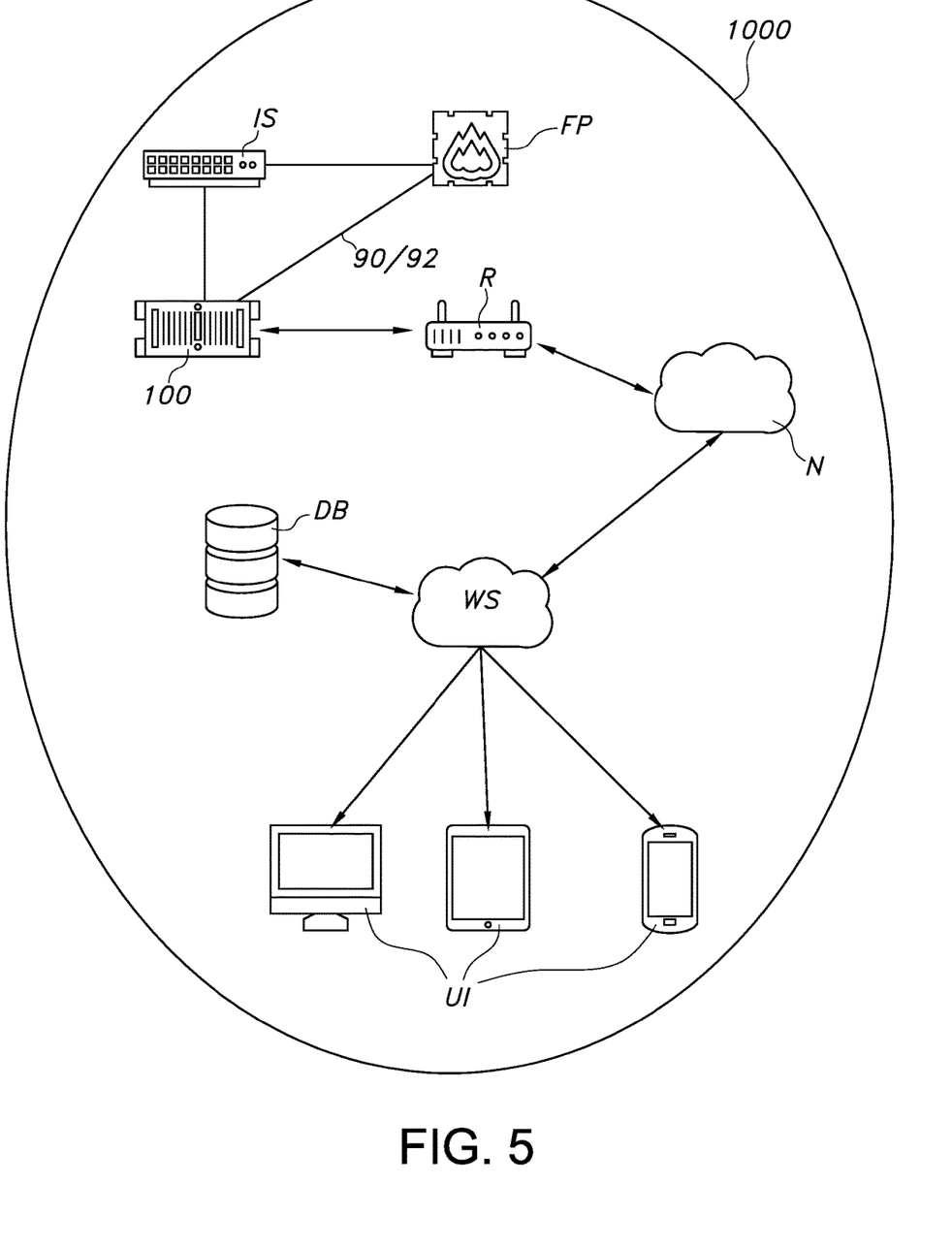
FIG. 5 illustrates a network that is used to remotely operate one or more electrical devices.

FIG. 5 illustrates a system 1000 for using the control device 100 to wirelessly control the one or more electrical devices FP, including the network N, the user interface device UI and the one or more electrical devices FP.

The user interface device UI is a computing device that is able to receive user input and transmit and receive data via the network N. For example, the user interface device UI may be a mobile device such as a smart-phone, tablet, or personal digital assistant, including those that operate on a native operating system such as iOS or DROID. The user interface device UI may also be a conventional computer system having an operating system such as Microsoft Windows, Apple OS X, or a Linux distribution. The user interface device UI is configured using conventional means to communicate via the network N and execute software applications that allow the operator to interact with and control the control device 100 as previously described.

The network N is a conventional wireless network, also referred to as a computer network, and may use any number of standard communication technologies, such as, for example, Ethernet, 802.11, 3G and/or 4G, digital subscriber lines, etc. Similarly, the network N may use any number of standard communication protocols, such as, for example, transmission control protocol/internet protocol (TCP/IP), simple mail transfer protocol (SMTP), file transfer protocol (FTP), and/or the hypertext transport protocol (HTTP). The data being exchanged over the network N may be represented using known technologies, such as hypertext markup language (HTML), and/or the extensible markup language (XML).

A conventional webserver WS may be used to connect the network N to the user interface devices UI. A conventional database DB may be provided to help control and manage the connections. And, a conventional wireless router R may be provided to facilitate the connection between the control device 100 and the network N.

Software on the user interface device UI provides the user with options to turn the fireplace FP on or off. For example, when the control device 100 is "on" the user sets a temperature and the device 100 automatically turns the fireplace on or off in order to bring and keep the room temperature at the desired level. Changing any of the settings causes the user interface device UI to send a wireless command from the user interface device UI across the wireless network N to the Wi-Fi module 14 on the programmable microcontroller 12.

It is understood that the embodiments described herein are merely illustrative of the present invention. Variations in the construction of the wireless control device may be contemplated by one skilled in the art without limiting the intended scope of the invention herein disclosed and as defined by the following claims.

What is claimed is:

1. A control device for remotely controlling one or more electrical devices that are millivolt devices or low voltage devices, the control device comprising:
   a circuit board having a programmable microcontroller that has a Wi-Fi module, a logic gate, an isolated relay, a device connection terminal, and an optical isolator that electrically isolates the programmable microcontroller from a power source;
   a power connector that connects the circuit board to the power source;
   a connection wire that connects the device connection terminal to the electrical device;
   wherein the Wi-Fi module is connectable to a wireless network;
   wherein the programmable microcontroller is able to receive commands from a user interface device over the wireless network through the Wi-Fi module; and
   wherein the programmable controller toggles the logic gate to open or close the isolated relay to start or stop the flow of electricity from the power source to the electrical device based on signals received from the user interface device.

2. The control device of claim 1, wherein the circuit board has a plurality of logic gates, each logic gate of the plurality of logic gates being connected to an isolated relay and each isolated relay being connected to a device connection terminal that is connectable to an electrical device; and
   wherein the programmable microcontroller is programmed to toggle any one of the plurality of logic gates in response to signals received from the user interface device.

3. The control device of claim 2, further comprising transient voltage suppressors that protect the control device from electrostatic charge.

4. The control device of claim 1, wherein the circuit board has one or more optical amplifiers that create a pulse-width modulation output to a low voltage isolated relay that is connected to a low voltage device connection terminal.

5. The control device of claim 1, further comprising an external temperature sensor that measures temperature of a room and is connected to the programmable microcontroller and wherein the programmable microcontroller is programmed to start or stop the flow of electricity to the electrical devices based on a reading from the temperature sensor.

6. The control device of claim 1, further comprising a temperature sensor that measures the temperature of the control device and wherein the programmable microcontroller is programmed to terminate the flow of electricity when the temperature rises above a predefined temperature.

7. The control device of claim 1, further comprising a thermocouple wire assembly;
   wherein the electrical device is an electrically controlled fireplace; and
   wherein the thermocouple wire assembly monitors the status of a flame in the fireplace and reports that status to the user interface device.

* * * * *